(12) United States Patent
De Jong et al.

(10) Patent No.: US 10,445,000 B2
(45) Date of Patent: Oct. 15, 2019

(54) DEVICE CONTROLLER AND METHOD FOR PERFORMING A PLURALITY OF WRITE TRANSACTIONS ATOMICALLY WITHIN A NONVOLATILE DATA STORAGE DEVICE

(71) Applicant: ARM LIMITED, Cambridge (GB)

(72) Inventors: Irenéus Johannes De Jong, Cambridge (GB); Andreas Hansson, Cambridge (GB)

(73) Assignee: ARM Limited, Cambridge (GB)

( * ) Notice: Subject to any disclaimer, the term of this patent is extended or adjusted under 35 U.S.C. 154(b) by 261 days.

(21) Appl. No.: 15/320,380

(22) PCT Filed: May 19, 2015

(86) PCT No.: PCT/GB2015/051467
§ 371 (c)(1),
(2) Date: Dec. 20, 2016

(87) PCT Pub. No.: WO2015/198009
PCT Pub. Date: Dec. 30, 2015

(65) Prior Publication Data
US 2017/0160933 A1   Jun. 8, 2017

(30) Foreign Application Priority Data

Jun. 24, 2014   (GB) .................................. 1411193.4

(51) Int. Cl.
*G06F 12/00* (2006.01)
*G06F 3/06* (2006.01)
(Continued)

(52) U.S. Cl.
CPC ................ *G06F 3/061* (2013.01); *G06F 3/06* (2013.01); *G06F 3/0656* (2013.01);
(Continued)

(58) Field of Classification Search
CPC ......... G06F 12/0246; G06F 2212/7201; G06F 9/467; G06F 9/466; G06F 12/0815; G06F 11/1471
See application file for complete search history.

(56) References Cited

U.S. PATENT DOCUMENTS

2004/0210706 A1   10/2004   In et al.
2006/0095659 A1*   5/2006   New ..................... G06F 3/0614
                                                               711/112
(Continued)

FOREIGN PATENT DOCUMENTS

WO   2012/016089   2/2012
WO   2014/150814   9/2014

OTHER PUBLICATIONS

International Search Report and Written Opinion of the ISA for PCT/GB2015051467 dated Aug. 12, 2015, 11 pages.
(Continued)

*Primary Examiner* — Mark A Giardino, Jr.
(74) *Attorney, Agent, or Firm* — Nixon & Vanderhye P.C.

(57) ABSTRACT

A device controller and method are provided for performing a plurality of write transactions atomically within a non-volatile data storage device. Each transaction specifies a logical address and the method comprises creating an address translation map for the logical addresses specified by the plurality of write transactions, by referencing an address translation record within the non-volatile data storage device to determine for each logical address a corresponding physical address within the data storage device. Further, if the corresponding physical address indicated in the address translation record already contains valid data, the logical address is remapped to a new physical address in the address translation map. However, at this point the address translation record as stored in the data storage device is not updated. Instead, the plurality of write transactions are
(Continued)

performed using the logical address to physical address mapping in the address translation map. Then, only once the plurality of write transactions have been performed is the address translation record updated in the non-volatile data storage device in order to identify the logical address to physical address mapping in the address translation map. Since, at the time of performing the write transactions, any new data that updates data already stored in the data storage device is written into a different physical address location, and hence the previous version of the data is still stored on the data storage device, and given that the address translation record is not updated unless the plurality of write transactions are actually performed atomically, then this enables the state held on the data storage device to be rolled back to the state that existed prior to performing the plurality of write transactions, if any event prevents that plurality of write transactions being performed atomically.

20 Claims, 12 Drawing Sheets

(51) Int. Cl.
| | | |
|---|---|---|
| G06F 12/02 | (2006.01) | |
| G06F 13/16 | (2006.01) | |
| G06F 9/46 | (2006.01) | |
| G06F 12/0802 | (2016.01) | |
| G06F 12/10 | (2016.01) | |
| G06F 13/00 | (2006.01) | |
| G06F 13/28 | (2006.01) | |

(52) U.S. Cl.
CPC ............ *G06F 3/0679* (2013.01); *G06F 9/467* (2013.01); *G06F 12/0246* (2013.01); *G06F 12/0253* (2013.01); *G06F 12/0802* (2013.01); *G06F 12/10* (2013.01); *G06F 13/16* (2013.01); *G06F 2212/222* (2013.01); *G06F 2212/65* (2013.01); *G06F 2212/7201* (2013.01)

(56) References Cited

U.S. PATENT DOCUMENTS

| | | | |
|---|---|---|---|
| 2007/0300009 A1 | 12/2007 | Rogers et al. | |
| 2010/0023682 A1* | 1/2010 | Lee | G06F 12/0246 711/103 |
| 2010/0153660 A1* | 6/2010 | Lasser | G06F 12/0246 711/154 |
| 2010/0199109 A1 | 8/2010 | Terek et al. | |
| 2014/0195564 A1* | 7/2014 | Talagala | G06F 12/0804 707/802 |
| 2014/0281145 A1* | 9/2014 | Tomlin | G06F 12/0246 711/103 |
| 2015/0169358 A1* | 6/2015 | Busaba | G06F 9/467 711/150 |

OTHER PUBLICATIONS

Search Report for GB1411193.4 dated Dec. 16, 2014, 3 pages.
Seung-Ho Lim et al. "Journal Remap-Based FTL for Journaling File System with Flash Memory", Computer Engineering Research Laboratory, *Department of Electrical Engineering and Computer Science, Korea Advanced Institute of Science and Technology*, Sep. 26-28, 2007, pp. 192-2003.
Eunji Lee et al. "Unioning of the Buffer Cache and Journaling Layers with Non-volatile Memory", *11th USENIX Conference on File and Storage Technologies*, (FAST '13), Sep. 12-15, 2013, pp. 73-80.
George Crump, "Power Failure and Flash Storage", *Storage Switzerland*, Apr. 10, 2013, 4 pages.
Vijayan Prabhakaran et al., "Transactional Flash", 8th USENIX Symposium on Operating Systems Design and Implementation , Dec. 8-10, 2008, pp. 147-160.
Jedec Standard, "Universal Flash Storage (UFS)", vol. 220, Feb. 2011, 260 pages.

* cited by examiner

DEVICE CONTROLLER AND METHOD FOR PERFORMING A PLURALITY OF WRITE TRANSACTIONS ATOMICALLY WITHIN A NONVOLATILE DATA STORAGE DEVICE

This application is the U.S. national phase of International Application No. PCT/GB2015/051467 filed 19 May 2015 which designated the U.S. and claims priority to GB Patent Application No. 1411193.4 filed 24 Jun. 2014, the entire contents of each of which are hereby incorporated by reference.

FIELD OF THE INVENTION

The present invention relates to a device controller and method for performing a plurality of write transactions atomically within a non-volatile data storage device.

BACKGROUND OF THE INVENTION

There are a number of situations where it is desirable to perform multiple write transactions to different locations within a non-volatile data storage device atomically. For example, this may be due to the data files being written being too large to fit in one location, or due to an operation requiring updates in multiple locations. An example of this latter scenario is when a new file is created in a folder. The file needs to be written to the appropriate location in the non-volatile storage device, but in addition the metadata describing the folder structure in which the file is located also needs to be updated. Completion of one of these steps without the other (for instance due to a system crash) would either result in the file system indicating that there is a file which is not in fact there, or alternatively a file will exist within the storage device which is taking up space, but which is not available for access due to it not being referred to by the file system.

By arranging for a plurality of write transactions to occur atomically, this will ensure that all of those plurality of write transactions are completed, or none are completed, hence avoiding the possibility of the non-volatile data storage device ending up in an undefined state due to only a subset of the transactions having been performed.

Typically a series of write transactions would be initiated by a host device, for example a CPU, and the host device will then communicate with the non-volatile data storage device via a device controller associated with the data storage device in order to cause the transactions to be performed. When dealing with the above described write atomicity issue, in known prior art techniques it is typically the case that the host system takes responsibility for ensuring that the write transactions are performed atomically, resulting in an overhead to the software system and/or the file system of the host device.

In particular, one known approach is to employ journaling techniques whereby the host device generates some journal data for storing on the non-volatile storage device prior to the actual transactions being performed, such that if a failure occurs inconsistent data can be discovered and restored to a consistent state. Such journaling techniques lead to extra transactions being generated, with associated extra write actions being performed within the storage device. In the worst case of journaling (from a performance point of view, but the best kind from a reliability point of view), the actual data is sent twice to ensure correctness. However, such an approach negatively affects both performance and power. The known journaling mechanisms are typically independent of the underlying technology of the non-volatile data storage device, and typically form part of the file system of the host device.

It would be desirable to provide an improved mechanism for performing a plurality of write transactions atomically within a non-volatile data storage device, without requiring the use of host-side implemented safety mechanisms.

SUMMARY OF THE INVENTION

Viewed from a first aspect, the present invention provides a method of operating a device controller to perform a plurality of write transactions atomically within a non-volatile data storage device, each transaction specifying a logical address, the method comprising: creating an address translation map for the logical addresses specified by said plurality of write transactions, by referencing an address translation record in the non-volatile data storage device to determine for each logical address a corresponding physical address within the data storage device, and if the corresponding physical address indicated in the address translation record already contains valid data, remapping the logical address to a new physical address in said address translation map; performing said plurality of write transactions using the logical address to physical address mapping in said address translation map; and updating the address translation record in the non-volatile data storage device to identify the logical address to physical address mapping in said address translation map only once said plurality of write transactions have been performed in said non-volatile storage device.

In accordance with the present invention, the non-volatile data storage device is constrained such that if a write transaction is performing a write operation in order to update valid data already stored on the data storage device, then at the time of performing the write operation the pre-existing data on the data storage device is not overwritten, but instead the new data is written to a different physical address within the data storage device. This constraint is already present in a number of known non-volatile data storage devices, and will be referred to herein as an out-of-place rewrite constraint. For example, NAND flash memory requires that once a page of data has been written, it has to be erased before new data can be written to that page. Accordingly, when performing a write in respect of data already stored within a page, the new data is typically stored within a different page, with flash maintenance operations later being performed to invalidate and erase data that is no longer current. In accordance with the present invention, this out-of-place rewrite requirement is utilised when developing a new transaction sequence protocol for performing a plurality of write transactions atomically, this new transaction sequence protocol allowing later rollback of the state on the data storage device to that that existed prior to the plurality of write transactions, if the plurality of write transactions are not completed, for example, due to a system crash.

In particular, in accordance with the present invention, an address translation map is created for the logical addresses specified by the plurality of write transactions. To do this, an address translation record in the non-volatile data storage device is referenced to determine for each logical address a corresponding physical address within the data storage device. If the corresponding physical address indicated in the address translation record already contains valid data, then when creating the address translation map the associated logical address is remapped to a new physical address in the address translation map. However, at this stage, no update to the address translation record in the non-volatile data storage device is performed.

Instead, the plurality of write transactions are then performed using the information in the address translation map, and only once all of those plurality of write transactions have been performed is the address translation record then updated in the non-volatile data storage device.

As a result, if any event results in the full plurality of write transactions that are required to be performed atomically not all being completed, then the address translation record in the non-volatile storage device will still correctly provide the correct logical address to physical address mapping for the state of the data on the non-volatile data storage device that existed prior to the plurality of write transactions being performed. Further, due to the out-of-place rewrite nature of the non-volatile data storage device, no previously stored state on the non-volatile data storage device will have physically been overwritten during performance of the plurality of write transactions, and accordingly it is possible to use the address translation record in the non-volatile data storage device to rollback to the previous state of the data storage device if the atomicity of the plurality of write transactions is prevented.

There are a number of ways in which information about the plurality of write transactions can be maintained so as to enable later detection of a situation where those plurality of write transactions have not been able to be performed atomically. In one embodiment, the method further comprises, prior to performing the plurality of write transactions, performing an intent save operation to store within an area of the non-volatile data storage device intent information identifying the plurality of write transactions to be performed atomically and the logical address to physical address mapping in said address translation map.

Hence, this will provide a record on the non-volatile data storage device of the plurality of write transactions that were intended to be performed atomically, and this information can be referenced later in order to determine whether the write transactions have or have not in fact been performed atomically. In particular, since the address translation record in the non-volatile storage device will only be updated once all of the plurality of write transactions have been performed, such an update to the address translation record will only occur if the write transactions have been performed atomically. If some event has prevented the write transactions being performed atomically, there will be some mismatch between the information in the address translation record stored in the non-volatile storage device and the information saved via the above-mentioned intent save operation.

In one embodiment, the intent save operation is performed as a write transaction having a higher priority than the plurality of write transactions to be performed atomically. This ensures that the information identifying the plurality of write transactions to be performed atomically is written to the non-volatile storage device before the actual sequence of write transactions begins.

There are various options as to where within the non-volatile data storage device the intent information is saved. In one embodiment, the non-volatile data storage device comprises a main non-volatile storage unit and a non-volatile cache configured to buffer data prior to writing of that data into the main non-volatile storage unit, and said area of the non-volatile data storage device where the intent information is stored is within said non-volatile cache. In embodiments where non-volatile cache is provided within the data storage device, the storing of the intent information within the non-volatile cache avoids the need to perform any write operations directly within the main non-volatile storage unit merely to store the intent information. This is beneficial, since the intent information is only of transitory interest, to allow determination of situations where the write transactions have not been performed atomically. Normally, it is expected that the write transactions will be performed atomically, and that the address translation record will then be updated following the performance of the write transactions. Once this process has been completed, then the state of the data storage device will correctly reflect the data as updated by the plurality of write transactions, and accordingly at that point there will no longer be any need for the intent information.

In one embodiment, the address translation map created prior to performing the plurality of write transactions is stored in volatile storage associated with the device controller, for reference by the device controller when performing the plurality of write transactions. This ensures that the information required by the device controller to perform the plurality of write transactions is readily available, without having to perform any read operations from the non-volatile data storage device in order to obtain the required address mappings for the write transactions.

In one embodiment, a garbage collection process is used to invalidate any out of date data held on the non-volatile data storage device. However, in accordance with one embodiment, the step of activating the garbage collection process follows the step of updating the address translation record in the non-volatile storage device. By ensuring that the garbage collection process is not activated until the address translation record is updated, and given that the address translation record is not updated until all of the plurality of write transactions have been performed (i.e. the write transactions have been correctly performed atomically), this ensures that no data is invalidated within the non-volatile data storage device until it is known that there will be no need to rollback to that data (because it is known that the plurality of write transactions have correctly been performed atomically as desired).

In one embodiment, the device controller receives the plurality of write transactions from a host entity, the host entity identifying to the device controller that the plurality of write transactions are to be handled atomically. Hence, it is the host entity that decides that the plurality of write transactions are to be handled atomically. However, in contrast with the known prior art techniques, in accordance with the present invention the host entity does not itself need to undertake any measures to seek to ensure that the transactions are performed atomically. Instead, the above described sequence of steps performed by the device controller when communicating with the data storage device ensures that the write transactions will either be performed atomically, or else, if an event prevents that from occurring, the previous state of the data storage device can be reliably retrieved, hence allowing rollback to that previous state.

In situations where it is detected that an incomplete transfer may have occurred, such that the plurality of write transactions may not have been performed atomically, then a trigger condition can be raised to cause some checks to be performed. For example, such a trigger condition could automatically be generated during a reboot process performed on the non-volatile data storage device, since the reboot may have occurred due to a loss of power, or some crash within the system, and hence this provides an appropriate situation for checking whether the plurality of write transactions have been performed atomically. However, it will be appreciated that the trigger condition could also be raised in other situations where it is expected that a recovery process may be required.

In one embodiment, in response to such a trigger condition, the method comprises performing the following steps: obtaining the address translation table and the intent information from the non-volatile storage device; and determining, for each write transaction identified in the intent information, whether the logical address to physical address mapping indicated by the intent information matches the logical address to physical address mapping in the address translation table.

As discussed earlier, if the write transactions did complete atomically, it would be expected that the currently stored intent information would match the information held in the address translation table. However, if there was any interruption during the performance of the sequence of write transactions which prevented those transactions completing atomically, then the address translation record would not have been updated, and accordingly there would be a mismatch between the information in the address translation record stored on the non-volatile data storage device and the stored intent information.

Accordingly, in one embodiment, if, for any write transaction identified in the intent information, the logical address to physical address mapping indicated by the intent information does not match the logical address to physical address mapping in the address translation table, the method further comprises the step of invalidating the data at the physical address identified for every write transaction in the intent information. This hence invalidates the data written by any of the transactions within the plurality of transactions that were required to be performed atomically. Further, since the address translation record would not have been updated, it will still correctly reflect the state of the data storage device prior to those plurality of write transactions being initiated.

In one embodiment, in such a situation where the data is effectively rolled back to the previous state, then a notification may be issued to the host entity to provide an indication that the plurality of write transactions have not been performed. This enables appropriate action to be taken by the host, such as retrying performance of the plurality of write transactions.

In embodiments where the non-volatile data storage device includes a non-volatile cache in addition to the main non-volatile storage unit, then in one embodiment the step of performing the plurality of write transactions may comprise initially writing the data of each write transaction to the non-volatile cache and then subsequently storing the data of each write transaction from the non-volatile cache into the main non-volatile storage unit at the physical address specified by the address translation map.

From a wear levelling and performance point of view, caching the data prior to actually committing it to the main non-volatile storage unit may be attractive, particularly in situations where it is possible that the data to be written will itself be updated before the data is committed to the main non-volatile storage unit, since in that situation it is possible to reduce the number of write operations performed within the main non-volatile storage unit. However, care needs to be taken in such situations to ensure that it is possible to rollback to a correct state if transactions are unable to be performed atomically.

In one embodiment the plurality of write transactions form a first atomic write sequence, and the device controller is requested to perform a second atomic write sequence comprising a second plurality of write transactions. With the above issue in mind, if at least one of the second plurality of write transactions specifies a logical address associated with a write transaction of the first atomic write sequence whose data has not yet been stored within the main non-volatile storage unit, the first and second atomic write sequences are merged into a single atomic write sequence such that the data written to the non-volatile cache represents the single atomic write sequence.

Furthermore, in one embodiment, the method further comprises updating within the area of the non-volatile data storage device the intent information identifying the plurality of write transactions to be performed atomically and the logical address to physical address mapping in said address translation map, so that the intent information reflects the single atomic write sequence.

Furthermore, in one embodiment the step of updating the address translation record in the non-volatile data storage device is performed only after the write transactions of the merged single atomic write sequence have been performed.

By the above steps, in a situation where an event interrupts the atomicity of the operation, the system is able to rollback two full states, i.e. back to a state that existed prior to performance of either the first atomic write sequence or the second atomic write sequence. This will still be a stable state, and hence the system can recover to a workable environment.

When the non-volatile data storage device is heavily used, it is possible that the above techniques of merging atomic write sequences could make it possible to postpone an update to the address translation record in the non-volatile data storage device for a prolonged period, potentially almost indefinitely. However, it may be desirable to avoid such a situation arising, and in one embodiment this is achieved by placing an upper bound on the number of atomic write sequences that can be merged. Accordingly, on reaching the upper bound the device controller causes the current merged atomic write sequence to complete, and the update to the address translation record in the non-volatile data storage device to be performed, before allowing a further atomic write sequence to be performed.

A predetermined command can also be provided to bring about the same effect, rather than waiting for an upper bound to be reached. Hence, in such embodiments, in response to such a predetermined command, the device controller causes a current merged atomic write sequence to complete, and the update to the address translation record in the non-volatile data storage device to be performed, before allowing a further atomic write sequence to be performed. Hence, this predetermined command can be used to ensure inter device state synchronisation. The command will only be acknowledged once all of the previous transactions have been completed, and in particular the write data written to the non-volatile data storage device.

The non-volatile data storage device can take a variety of forms, but in one embodiment is a flash storage device comprising a number of storage blocks, each storage block comprising one or more storage pages. A flash storage device is an example of a storage device that has the earlier-mentioned out-of-place rewrite property, and hence the above described techniques can readily be employed within such a flash storage device.

Viewed from a second aspect, the present invention provides a device controller for performing a plurality of write transactions atomically within a non-volatile data storage device, each transaction specifying a logical address, the device controller comprising: address translation map generation circuitry configured to create an address translation map for the logical addresses specified by said plurality of write transactions, by referencing an address translation record in the non-volatile data storage device to determine for each logical address a corresponding physical address within the data storage device, if the corresponding physical address indicated in the address translation record already contains valid data, the address translation map generation circuitry being further configured to remap the logical address to a new physical address in said address translation map; transaction control circuitry configured to perform said plurality of write transactions using the logical address to physical address mapping in said address translation map; and address translation record update circuitry configured to update the address translation record in the non-volatile data storage device to identify the logical address to physical address mapping in said address translation map only once said plurality of write transactions have been performed in said non-volatile data storage device.

Whilst the device controller may in one embodiment be formed from dedicated hardware used to control the accesses to the non-volatile data storage device, in an alternative embodiment the device controller may be embodied by software running on a general purpose processor such as a CPU. Accordingly, in accordance with a third aspect, the present invention provides a computer program product comprising a computer program which when executed on a computer causes the computer to perform the method in accordance with the first aspect of the present invention. In one embodiment the computer program product stores the program in a non-transitory form.

Viewed from a fourth aspect, the present invention provides a device controller for performing a plurality of write transactions atomically within a non-volatile data storage device, each transaction specifying a logical address, the device controller comprising: address translation map generation means for creating an address translation map for the logical addresses specified by said plurality of write transactions, by referencing an address translation record in the non-volatile data storage device to determine for each logical address a corresponding physical address within the data storage device, if the corresponding physical address indicated in the address translation record already contains valid data, the address translation map generation means further for remapping the logical address to a new physical address in said address translation map; transaction control means for performing said plurality of write transactions using the logical address to physical address mapping in said address translation map; and address translation record update means for updating the address translation record in the non-volatile data storage device to identify the logical address to physical address mapping in said address translation map only once said plurality of write transactions have been performed in said non-volatile data storage device.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1A:
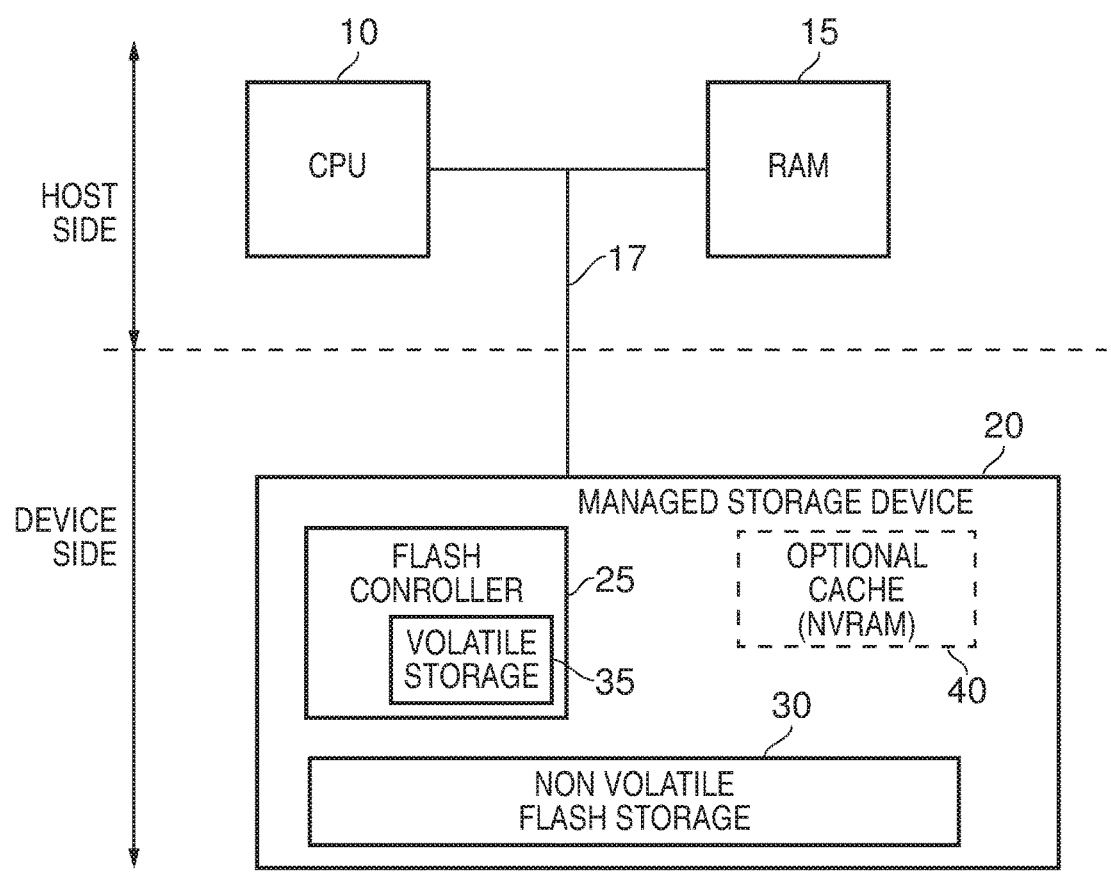
FIG. 1A is a block diagram illustrating a system in accordance with a first embodiment.

FIG. 1A is a block diagram of a system in accordance with one embodiment. In this embodiment, it is assumed that the non-volatile data storage device 20 takes the form of a managed storage device with its own internal device controller 25 for controlling the performance of write transactions to the non-volatile storage 30. In this particular example, it is assumed that the non-volatile storage 30 is non-volatile flash storage, and accordingly the device controller 25 is a flash controller. Flash memory is typically formed from NAND devices, and is arranged as a plurality of blocks, such as the blocks 72, 73, 74, 75, 76 shown for example in FIG. 1C for the flash storage 70. Within each block there are a plurality of pages 82, 84, 86.

NAND flash memory is page readable and programmable. Read actions typically take about ten times less than write actions. Further, once a page has been written to, it has to be erased before new data can be written to that page again, and accordingly if a data file needs to be updated, then the file (or a part of it) is usually physically moved on the flash disk, although the logical address may stay the same. Accordingly, the new data will then typically be written to a different page. Whilst the out of date data will then still physically reside on the disk, flash maintenance operations such as garbage collection and wear levelling are performed in the flash disk to invalidate and subsequently erase out of date data (either by the device itself in the case of a managed storage device such as the managed storage device 20, or by host software operating on the host side, in the example of an unmanaged storage device as will be discussed later with reference to FIG. 1B). This maintenance functionality is typically bundled in an abstraction layer called the Flash Translation Layer (FTL).

The action of writing updated data to a new physical location within the flash memory, rather than directly overwriting the previous version of the data at the time of performing the write operation, is referred to herein as out-of-place rewriting. As will be discussed in more detail later, this property of flash memory is taken advantage of, when providing a transaction sequence protocol between the flash controller and the flash storage that allows for a series of write transactions to be performed atomically, and for detection and rollback mechanisms to be incorporated to address situations where the write transactions were not performed atomically, for example due to a system crash or the like interrupting the sequence of transactions part way through.

Figure 1B:
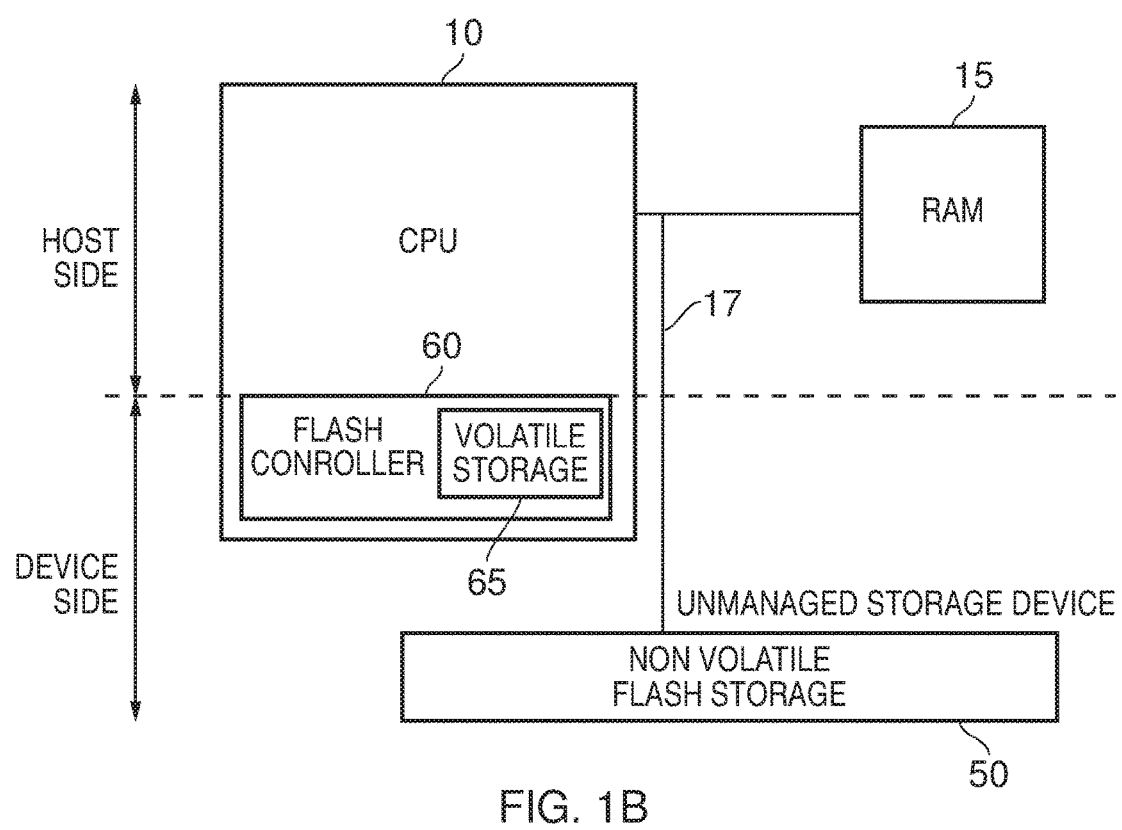
FIG. 1B is a block diagram illustrating a system in accordance with an alternative embodiment.
Figure 1C:
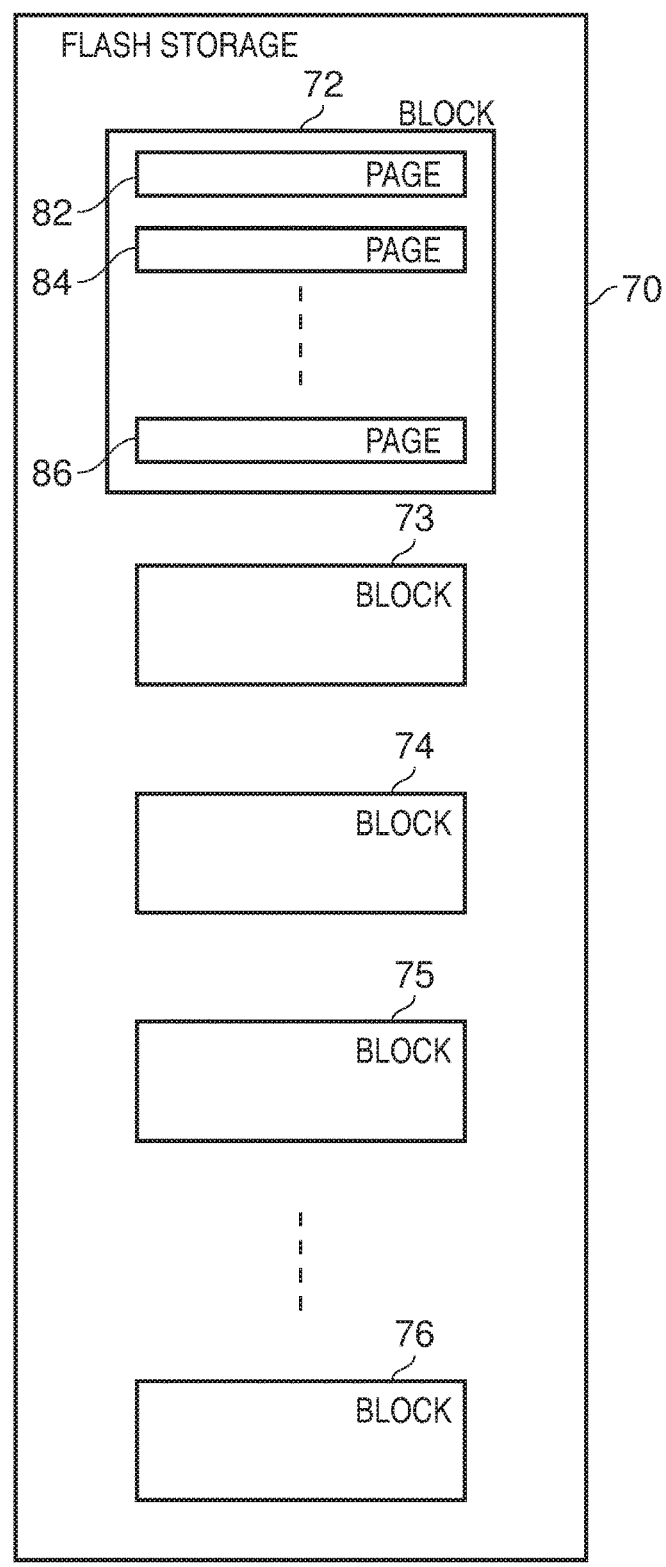
FIG. 1C schematically illustrates the arrangement of the flash storage of FIG. 1A or 1B in accordance with one embodiment.

In NAND flash memories, erase actions also typically have to be performed on a per block basis, where one block contains multiple pages (as will be apparent from FIG. 1C). The action of writing updated data to new pages, along with the associated flash maintenance operations that then later mark as invalid out of date data, can be used to allow over time for a whole block of the flash storage to reach a state where it no longer contains any valid data, whereafter it can then be erased, freeing up the pages of that block for being reused for subsequent write operations.

Returning to FIG. 1A, it is assumed that the CPU 10 wishes to initiate a series of write transactions which it requires the managed storage device 20 to perform atomically. As will be discussed in more detail later, the host device CPU will issue to the managed storage device 20 over path 17 an indication that there are a bundled sequence of transactions to be performed atomically, which will then cause the flash controller 25 to undertake a particular sequence of operations discussed later for example the reference to FIG. 5. This will involve storing certain control information in the volatile storage 35 local to the flash controller, to allow the flash controller to perform each of the various write transactions that are required to be performed atomically. The managed storage device 20 may optionally include some cache storage 40, and typically where such cache storage is provided, it is provided as non-volatile cache storage (e.g. NVRAM), for example through the use of a backup battery to maintain the state within the cache.

When constructing the write transactions for transfer to the managed storage device, the CPU may write the transaction data in a random access memory (RAM) 15 provided on the host side of the system in association with the CPU. The flash controller can then fetch the data from the RAM as and when required during the performance of the sequence of write transactions. As will be discussed in more detail later, in one embodiment the data may be written directly into the non-volatile flash storage by the flash controller, but where the optional cache is provided, it may first be stored within the cache 40, and subsequently written from the cache into the non-volatile flash storage 30. When the sequence of transactions has been completed, the flash controller 25 will typically issue an acknowledgement back to the CPU 10. The exact timing of the acknowledgment signal can vary dependent on embodiments.

Whilst in FIG. 1A a managed storage device 20 is considered, having its own flash controller 25, in an alternative embodiment an unmanaged storage device 50 may be used, as shown in FIG. 1B. In such an embodiment, the flash controller typically takes the form of software executing on the CPU 10, such as indicated by the flash controller 60 shown in FIG. 1B. Again, the flash controller will have access to some local volatile storage 65. Whilst the flash controller is in this embodiment formed by software executed on the CPU, it can still be considered to be contained within the device side of the system, as indicated by the dotted line in FIG. 1B.

Figure 2:
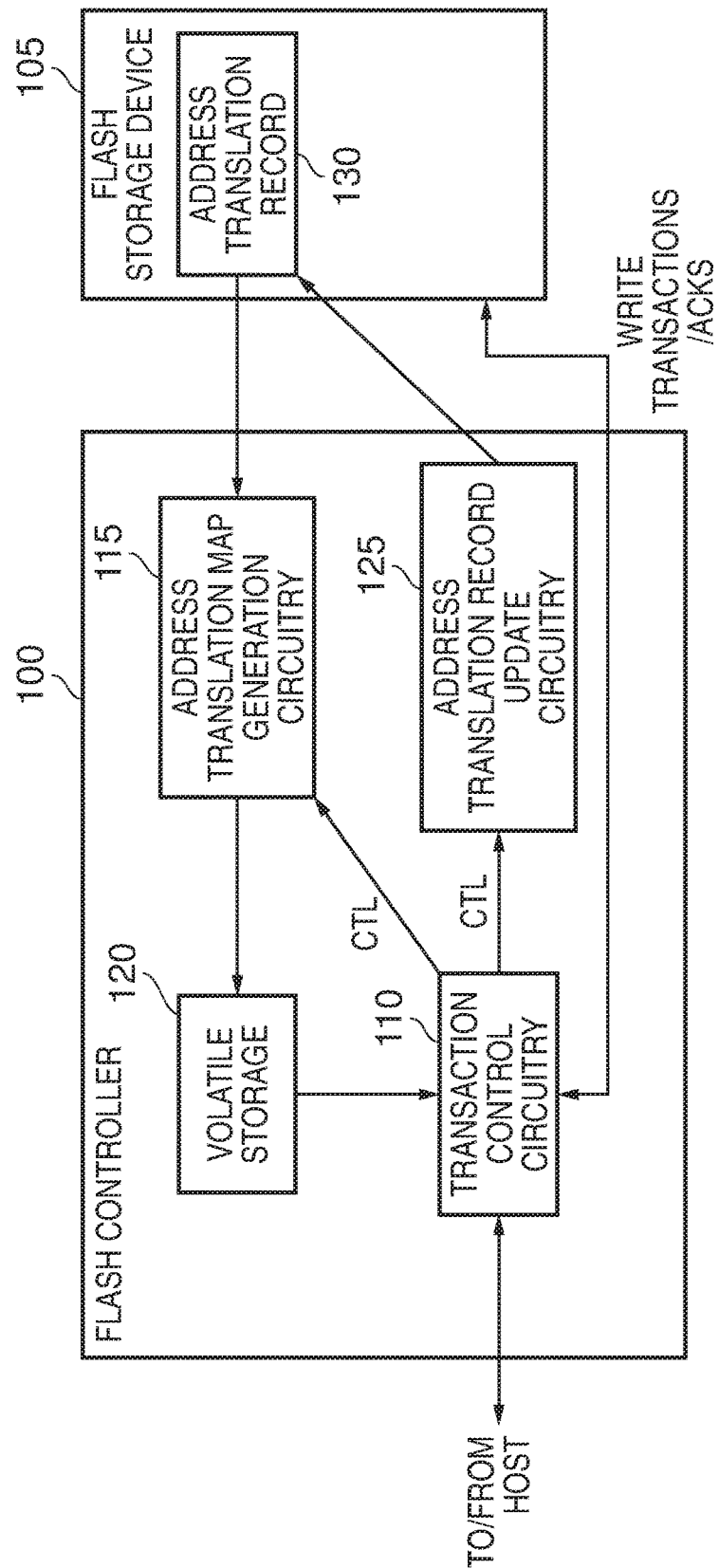
FIG. 2 is a block diagram illustrating in more detail the operation of the flash controller of FIG. 1A or 1B in accordance with one embodiment.

FIG. 2 is a block diagram illustrating in more detail components provided within the flash controller of FIG. 1A in accordance with one embodiment. The flash controller 100 includes transaction control circuitry 110 for controlling the sequence of transactions required. The transaction control circuitry 110 communicates with the host device (for example the CPU 10 of FIG. 1A) in order to obtain details of the transactions to be performed, and in order to acknowledge completion of those transactions. During the performance of the transactions, the transaction control circuitry will issue various control signals to other components within the flash controller. In particular, the address translation map generation circuitry 115 is used to generate an address translation map for the logical addresses specified by each of the write transactions forming a group of write transactions to be performed atomically.

To do this, the address translation map generation circuitry 115 references an address translation record 130 held within the flash storage device 105 mapping logical addresses to physical addresses containing the data associated with those logical addresses. If the address translation map generation circuitry determines during this process that the corresponding physical address indicated in the address translation record already contains valid data, the address translation map generation circuitry remaps the logical address to a new available physical address in the address translation map. However, at this time no update to the address translation record 130 maintained within the flash storage device is made. Instead, a local copy of the address translation map is stored within the volatile storage 120 of the flash controller 100, for use by the transaction control circuitry 110 when issuing the various write transactions to the flash storage device 105.

In particular, for each write transaction, the transaction control circuitry will issue a command to the flash storage device to cause the write data to be written at the physical storage location identified by the logical to physical address mapping within the volatile storage 120. Only once all of the transactions have been processed will the transaction control circuitry then cause the address translation record update circuitry 125 to update the address translation record 130 within the flash storage device 105. In particular, at this point, the information maintained in the address translation map in the volatile storage 120 can be incorporated within the address translation record in order to produce an updated translation record 130 stored within the flash storage device 105.

Whilst in FIG. 2 the address translation record 130 is shown as a discrete block of data stored within the flash storage device 105, in alternative embodiments the address translation record 130 is instead constructed from extra bits of data stored in association with each flash page within the flash storage device, rather than all of address translation record information being stored as a physically separate record within the flash storage device.

Whilst FIG. 2 shows circuit components provided within the flash controller 25 in FIG. 1A, it will be appreciated that in accordance with the software implementation of the flash controller of FIG. 1B, the various blocks within FIG. 2 can be implemented by appropriate software routines running on the CPU 10.

Figure 3:
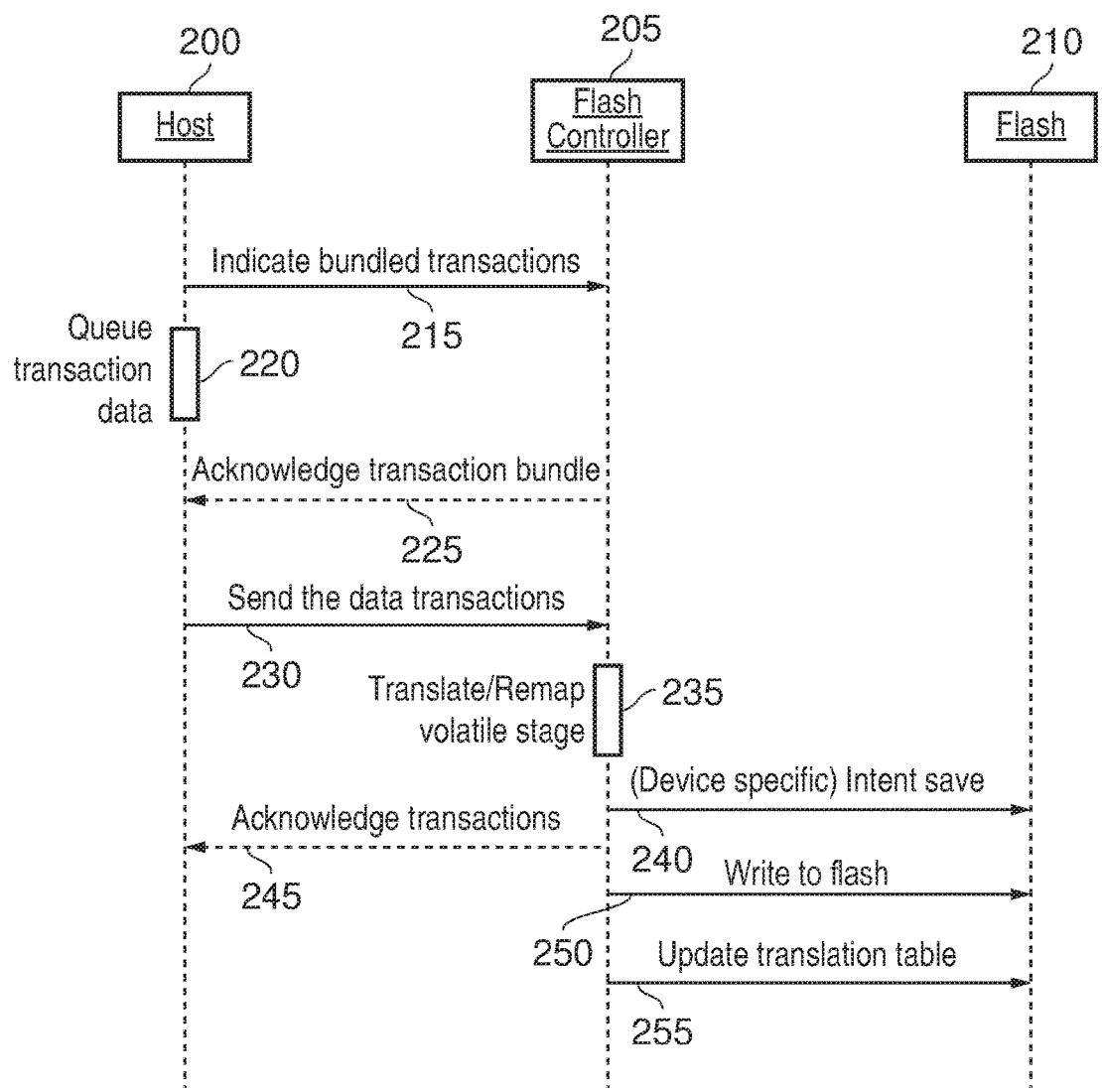
FIG. 3 is a sequence diagram of a transaction flow in accordance with one embodiment.

FIG. 3 is a sequence diagram showing a transaction flow in accordance with a first embodiment. As is clear from FIG. 3, certain communications take place between the host 200 and the flash controller 205, and in addition further communications occur between the flash controller 205 and the actual flash storage 210. Firstly, as indicated by the arrow

215, the host will send a bundle indication to the flash controller identifying that there are a series of write transactions that it requires to occur in an atomic fashion. The host will then queue the transaction data, as indicated by the block 220. This for example may occur by the host constructing and queuing the relevant transaction data within the RAM 15 for access by the flash controller in due course.

Once the flash controller has acknowledged the transaction bundle (as indicated by the arrow 225), then the individual data transactions can begin to be sent from the host to the flash controller, as indicated by the arrow 230.

For each received transaction, the flash controller will translate the specified logical address to a physical address using the information stored in the address translation record on the flash storage device. Where the physical address mapped to already contains valid data, then the flash controller will additionally remap the logical address to a new available physical address. Accordingly, during the sequence indicated by the block 235 in FIG. 3, the earlier mentioned address translation map will be created, and will be stored locally within the volatile storage of the flash controller.

Prior to initiation of the various write operations required by the series of transactions, in accordance with one embodiment the flash controller sends a command to the flash storage 210 specifying an intent save operation. In particular, the command can take the form of a specific write transaction (also referred to herein as a intent save write transaction) identifying intent information to be stored in an area of the non-volatile data storage device, that intent information identifying the plurality of write transactions to be performed atomically and the logical address to physical address mapping created in the address translation map at step 235. In one embodiment, this intent save write transaction has a higher priority than normal write transactions, and accordingly it can be ensured that the intent save write transaction will be processed first, and accordingly the intent information will be stored in the flash storage device before any data of the write transactions begins to be written to the flash. In one particular embodiment, an example of such a higher priority write transaction is a device specific write transaction such as provided by the emerging UFS Standard (see http://www.jedec.org/standards-documents/results/jesd220). However, it be appreciated that there is no requirement to use this form of write transaction, and any other mechanism can be used whereby the intent save transaction can be marked as a high priority transaction.

Following performance of the intent save operation, the transactions can then be acknowledged back to the host at step 245. In particular, once the intent save operation has been performed, the flash controller is now able to ensure that the transactions will either be performed atomically, or, in the event that anything interrupts the atomic performance of those transactions, that the state of the flash device can be rolled back to the state that existed prior to any of the write transactions being performed. Accordingly, at this point the host is free to undertake other tasks without needing to monitor and ensure the atomicity of the write transactions. In particular, the host system can assume a consistent and correct file system on the underlying flash disk, provided that it follows the protocol shown in the transactions between the host and flash controller in the left hand side of FIG. 3.

As shown in FIG. 3, following performance of the intent save operation, then as indicated by the arrow 250 the various write operations required by each of the write transactions can then be performed. Only once all of those write transactions have been performed is the translation table then updated as indicated by the arrow 255, in order to reflect the information held in the address translation map within the volatile storage of the flash controller. Since, at the time the various write operations required by the series of write transactions are performed, any data that is updating valid data already stored on the flash device will be stored to a different physical location within the flash device, hence preserving at that stage the old data that is being overwritten in addition to storing the new data, and given that the translation table will only be updated if these series of write transactions do complete atomically as desired, then in the event that the write transactions are not performed atomically, the translation table will not be updated, and can be used in order to roll back the state of the flash device to the state that existed prior to any of the write transactions being performed. This will be discussed later with reference to FIG. 6.

Figure 4:
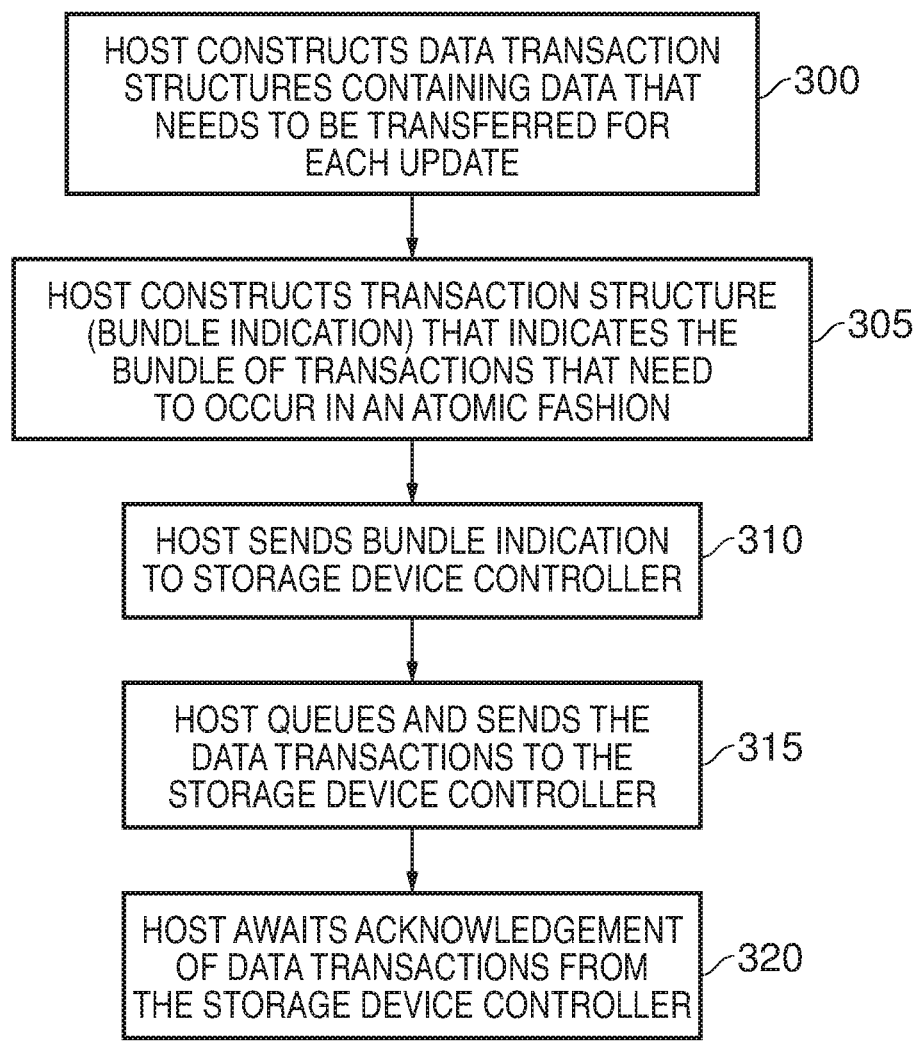
FIG. 4 is a flow diagram illustrating steps performed by the host device when it has multiple updates that need to be performed atomically, in accordance with one embodiment.

FIG. 4 is a flow diagram illustrating steps performed by the host when it has multiple updates that need to be performed atomically. At step 300, the host constructs the data transaction structures containing the data that needs to be transferred for each update, and may for example store those data transaction structures within the RAM 15 on the host side. In addition, at step 305, the host constructs a transaction structure (also referred to herein as a bundle indication) that indicates the bundle of transactions that need to occur in an atomic fashion, and at step 310 that bundle indication is then sent from the host to the flash controller.

At step 315, the host queues and sends the data transactions to the storage device controller, typically this occurring once the flash controller has acknowledged the bundle indication. Thereafter the host merely awaits acknowledgement of the data transactions from the flash controller at step 320. As discussed earlier with reference to FIG. 3, such an acknowledgement will typically be sent once the intent save operation has occurred. In particular, at this point the flash controller has all the information it needs to ensure that the write transactions are actually performed atomically or, in the event that that atomicity is prejudiced, that it can revert the state of the flash device back to the state that existed prior to any of the write transactions being performed.

Figure 5:
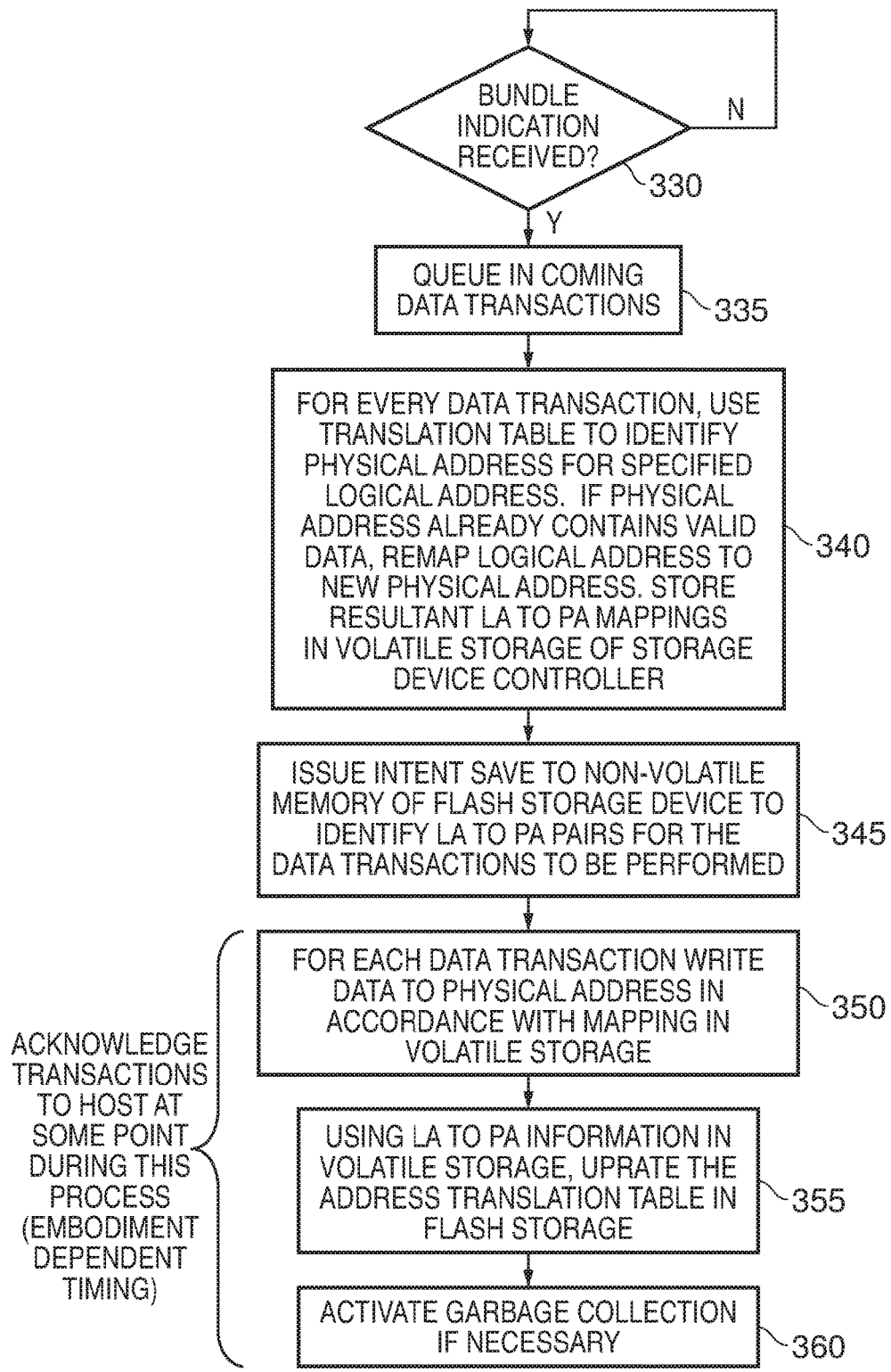
FIG. 5 is a flow diagram illustrating the steps performed by the storage device controller such as the flash controller of FIG. 1A or 1B when processing multiple updates atomically, in accordance with one embodiment.

FIG. 5 is a flow diagram illustrating the steps performed by the flash controller in order to process multiple updates atomically. At step 330, the bundle indication is awaited, and upon receipt of the bundle indication, the incoming data transactions are then queued at step 335. In particular, if the flash controller has a volatile storage of sufficient size to hold the data transactions that are to be performed atomically, then those data transactions are saved into the volatile storage at this time. Otherwise the data transactions will remain buffered on the host side at this point, for example within the RAM 15 shown in FIG. 1.

At step 340, for every data transaction in the bundle, the address translation table in the flash storage device is used to identify a physical address for the specified logical address. As mentioned earlier, if the physical address already contains valid data, then the logical address is remapped to a new physical address, with the resultant logical to physical address mappings being stored in the volatile storage of the flash controller as part of the address translation map constructed by the flash controller. Whilst for the purposes of the present application, the addresses specified by the host for the transactions will be referred to as logical addresses; they may also be referred to as virtual addresses.

At step 345, an intent save command is issued to the non-volatile memory of the flash storage device to identify the logical address to physical address pairs for the data transactions to be performed. In embodiments where there is a non-volatile cache structure provided within the storage device, such as the NVRAM 40 shown in FIG. 1A, then the intent save information may be stored directly within the NVRAM 40 rather than being stored in the flash storage 30. This avoids performing a write operation in respect of the flash storage 30 itself, in relation to information that is only required to be retained for a relatively transitory period. In particular, if the series of write transactions do indeed complete atomically as required, resulting in the translation table then being updated, then once the translation table has been updated to reflect the physical addresses associated with the various write transactions, the intent save information will no longer be required.

However, if a non-volatile cache structure is not provided, then instead the intent save information can be stored in one or more flash blocks dedicated to system information.

At some point following step 345, the transactions are acknowledged back to the host. As indicated in FIG. 5, this can be performed prior to performance of any of steps 350 to 360, or at some point during the performance of those steps.

At step 350, for each data transaction, the flash controller issues a write command to the flash storage to cause the write data to be written into the physical address identified by the address translation map held in its volatile storage. Once all of the write transactions identified in the bundle indication have been performed, then the logical address to physical address information in the volatile storage is used in order to update the address translation table held in the flash storage (see step 355). Thereafter, at step 360, garbage collection can be activated if necessary in order to invalidate any physical addresses no longer mapped to logical address by the updated translation table. The garbage collection process can also then undertake background tasks, such as erasing blocks that no longer contain any valid data.

Figure 6:
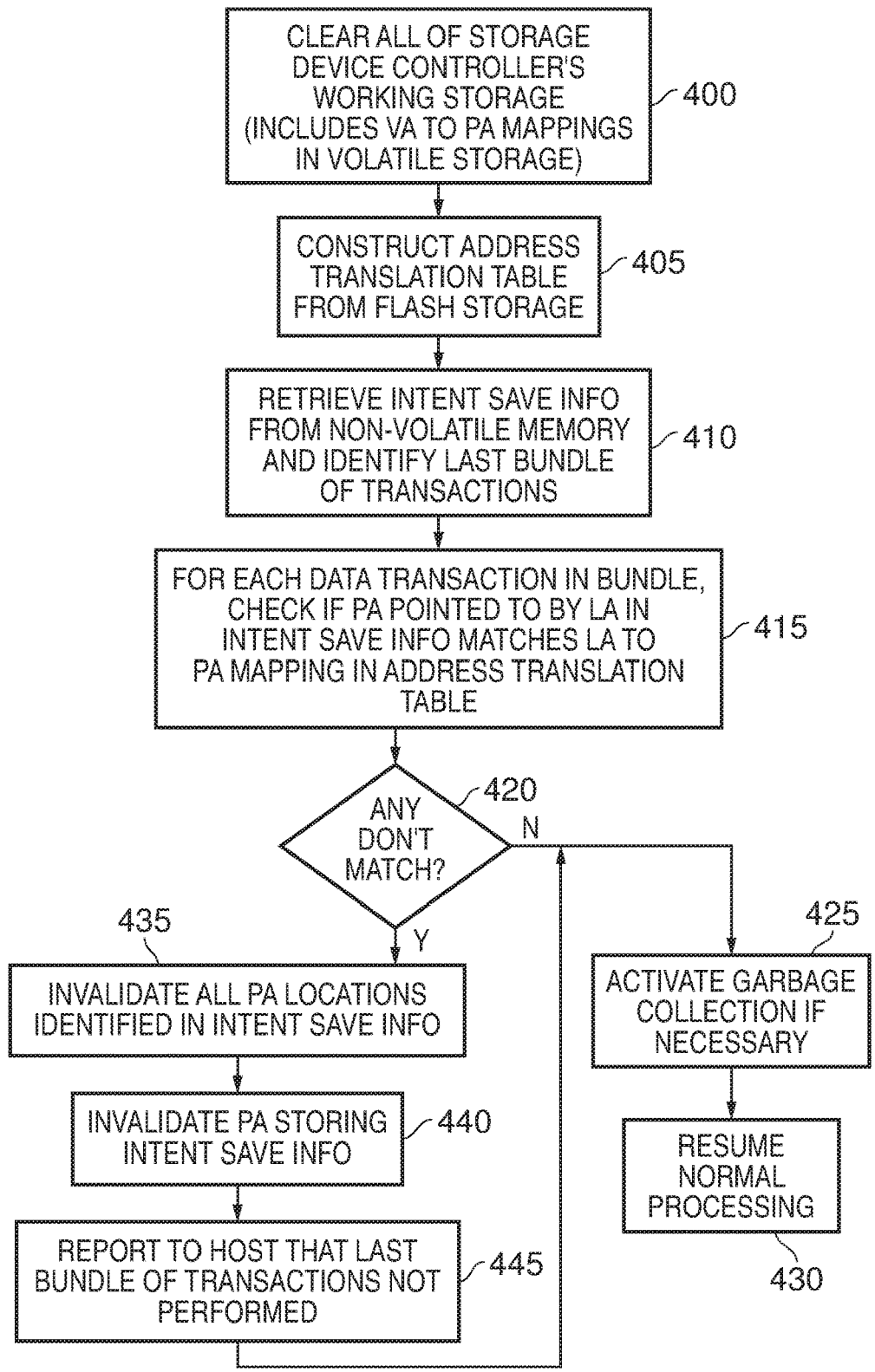
FIG. 6 is a flow diagram illustrating the steps performed upon booting up the flash device, or on initiation of a recovery process for any other reason, in accordance with one embodiment.

FIG. 6 illustrates a sequence of steps taken upon booting the flash storage device in accordance with one embodiment. At step 400, all of the flash controller's working storage, including the logical to physical address mappings in the volatile storage, is cleared. This ensures that during the boot process the flash controller only makes reference to write transaction information stored in the flash storage 30, 50 and in any non-volatile cache provided in association with the flash storage such as the cache 40 of FIG. 1A.

At step 405, the address translation table is constructed from the flash storage. As mentioned earlier, the address translation table may be stored separately within the flash storage, or indeed in an alternative embodiment may be reconstructed from extra bits stored in the flash pages themselves in association with the data stored at the various physical addresses.

In addition, at step 410, the intent save information is retrieved from non-volatile memory in order to identify the last bundle of transactions that should have been performed atomically. As mentioned earlier, in one embodiment the intent save information is stored within non-volatile cache within the storage device. Alternatively, it may reside within flash blocks dedicated to system information within the flash storage itself.

At step 415, for each write transaction identified in the bundle, a check is made to determine whether the physical address pointed to by the logical address in the intent save information matches the logical address to physical address mapping in the address translation table. If all of the transactions have been performed atomically, this should be the case, since following the performance of those transactions the address translation table would have been updated to match the logical address to physical address mapping forming part of the intent save information. However, if any check performed for any of the transactions in the bundle does not produce a match, then this indicates that the transactions did not complete atomically.

Accordingly, at step 420, it is determined whether any of the checks identified that there was not a match. If not, then it can be concluded that the last bundle of transactions did complete atomically, and the process can proceed directly to step 425, where garbage collection mechanisms can be activated if necessary in order to invalidate out of date data, and perform any required erase processes. At step 430 normal processing can then resume.

However, if it was detected at step 420 that, for at least one of the data transactions, there is not a match between the information in the address translation table and the corresponding address mapping information in the intent save information, then at step 435 all of the physical address locations identified in the intent save information are invalidated. In addition, at step 440, the physical address storing the intent save information is invalidated, assuming the intent save information had been written into the flash storage. Otherwise, the intent save information in the cache is merely marked as being invalid. Then, at step 445, a message is sent to the host to indicate that the last bundle of transactions has not been performed, whereafter the process continues at step 425.

In the event that the transaction did not complete atomically, then the address translation table would not have been updated, and accordingly will still provide logical to physical address mappings pointing to the previous data still validly held within the flash device. Accordingly, by invalidating all of the physical address location identified in the intent save information, this effectively rolls back the state of the flash device to the state that it was in prior to any of the transactions of the bundle being performed. This is hence a stable state from which processing can be resumed. For example, the host may seek to retry the bundle of transactions at this point.

As previously mentioned, within flash storage devices read times are significantly shorter than write times. Although the random access performance is quite good in flash devices, the sequential access performance is often worse than that of traditional hard drives. This has led to the implementation of caches and cache eviction schemes in flash drives (mainly SSD devices). However, this can cause problems from a reliability point of view, as the eviction schemes usually will not make the distinction between journaled data and normal data, making the order in which data is written to the flash disk unpredictable for the operating system. This is usually addressed by using non-volatile RAM for the cache, usually a battery-backed RAM module. However, this is quite expensive. Further, research shows that power loss may still corrupt the file system, because the quality of the battery decreases over time.

The cache within a flash storage device can be considered as two buffers, namely one read buffer and one write buffer. The eviction action for the read buffer is trivial from a persistence point of view, in that one can replace the evicted page with a new page and there will be no implications to the data on the flash disk. If the disk was in a stable state before eviction, it will be in a stable state after eviction.

However, write operations are more complex. Once data has been written to the cache, a transfer can be considered to have been completed, and can be acknowledged back to the host. However, the state is only stable after the data in the cache has been evicted and stored into the flash storage device, since before that happens the flash storage device only contains the old state of the data. Whilst evicting data from the cache to the flash storage, it is possible for new data to arrive, which may replace old data that has not yet been written to the flash disk. If the flash controller merely made the assumption that it could replace the page that is pending to be written to the flash disk, then effectively the transactions will happen out of order with respect to the order in which the host system has sent them, which would violate an isolation principle of the transactions. Furthermore, it might even bring the flash disk into an in between state between the old and new state, where some of the transactions for the next state have already been processed, whilst the previous batch of transactions has not yet finished.

Nevertheless, from a wear levelling and performance point of view, caching in the flash storage device is an attractive proposition, since it avoids writing data unnecessarily into the flash storage itself, which would take up time unnecessarily if that data was shortly afterwards to be updated. For example, if a first block of data is written to a free page, but then fairly shortly afterwards is updated, then that first page of data needs to be invalidated, and the new data needs to be written to a different page. Garbage collection mechanisms will then be used to subsequently invalidate and then erase the page that no longer contains useful data. All of these processes consume time and energy, and also contribute to reducing the lifetime of the flash storage.

Figure 7A:
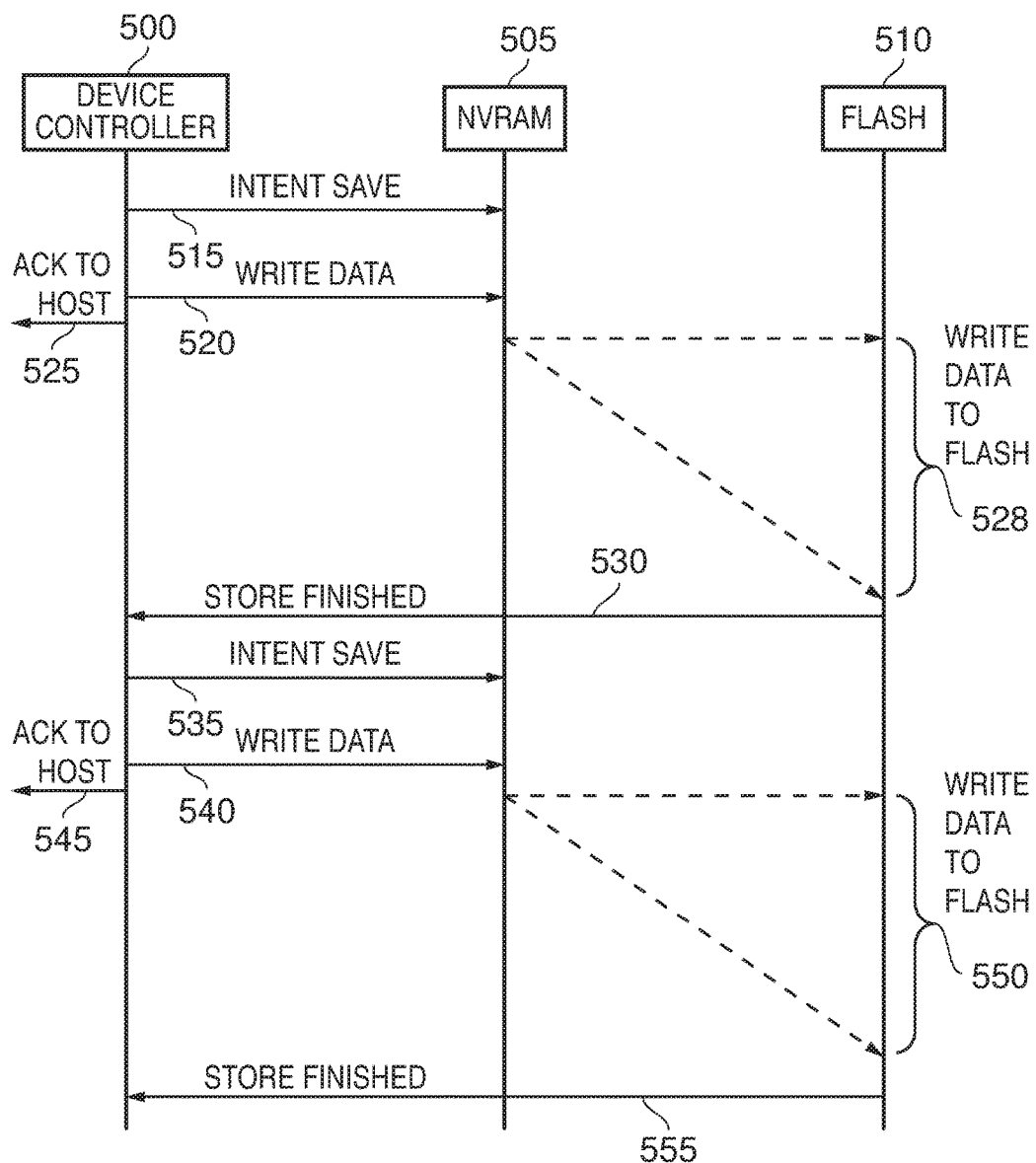
FIG. 7A illustrates an embodiment where the write data is cached within non-volatile RAM prior to being written to the flash device.
Figure 7B:
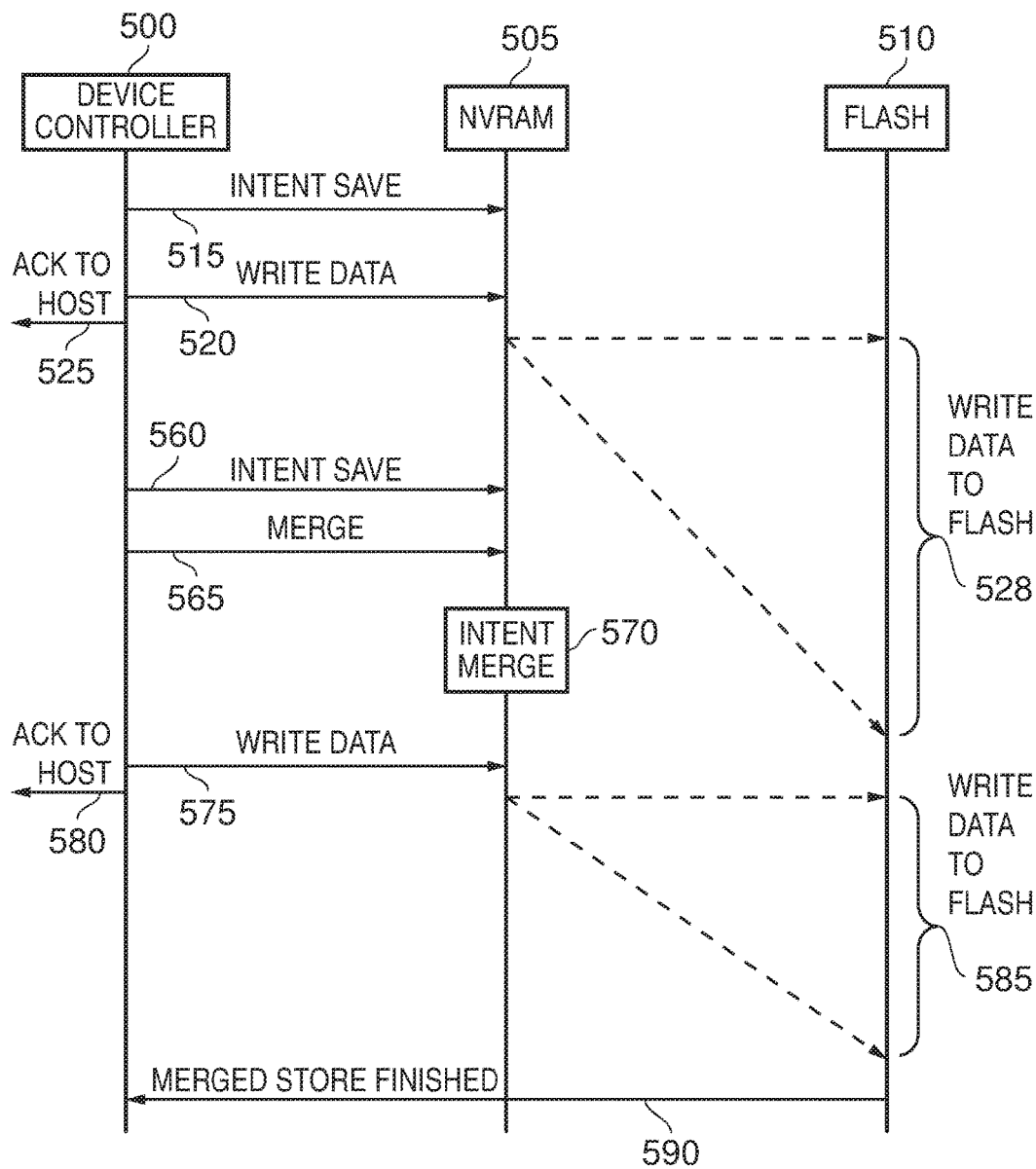
FIG. 7B illustrates the approach of FIG. 7A, but where two atomic transaction sequences are merged, in accordance with one embodiment.

FIGS. 7A and 7B are sequence diagrams showing a transaction flow that can be used in embodiments that incorporate non-volatile cache in order to allow efficient handling of transactions that addresses some of the above issues. For each bundle of transactions, the sequence of steps performed prior to issuing of the intent save command from the device controller (that were discussed for example with reference to FIG. 3) have been omitted for clarity from FIGS. 7A and 7B. Hence, the first step shown in FIG. 7A in relation to a first bundle of transactions is for the intent save command to be issued from the device controller 500 to the non-volatile RAM 505. Due to the presence of the non-volatile RAM, in this embodiment the intent save information is stored in the non-volatile RAM rather than being stored in the flash device 510 itself. At step 520, the data for each of the write transactions in the bundle is then also written into the cache 505. Once the data has been written into the cache, an acknowledgment is returned from the device controller 500 to the host over path 525. The exact timing of the acknowledgement can be varied dependent on embodiment.

Once the data for the various transactions has been written into the non-volatile cache, eviction mechanisms will then be used to evict that data for storage in the flash storage device 510. This process will typically involve multiple write operations to the flash storage and will take a period of time as indicated by the reference numeral 528 in FIG. 7A. Once all of the data has actually been committed to the flash storage, a store finished signal will be returned over path 530 to the device controller 500.

If a subsequent bundle of transactions then needs to be performed after the device controller has received the store finished acknowledgment, then that next bundle of transactions will be handled in exactly the same way as the first bundle, as indicated by the various stages 535, 540, 545, 550, 555 shown in FIG. 7A.

However, as shown in FIG. 7B, in one embodiment the transaction flow allows for two separate atomic write sequences to be merged within the storage device in certain situations. As shown in FIG. 7B, a first atomic write sequence proceeds in the same way as discussed earlier within reference to FIG. 7A, with the intent save information being stored in the NVRAM 505, followed by the write data of the transactions, and an acknowledgement being sent back to the host. In this example, it is assumed that during the process of writing the data of that first atomic write sequence to the flash storage during the period 528, a second atomic write sequence is initiated, where at least one of the write transactions in that second atomic write sequence specifies a logical address that is associated with a write transaction of the first atomic write sequence whose data has not yet been stored to the flash storage device 510. The device controller 500 will detect this situation, and in one embodiment, in addition to sending the intent save information over path 560 to the NVRAM 505, it also sends a merge command 565 indicating that that intent save information should be merged with the previous intent save information received over path 515. Control logic within the cache then performs an intent merge operation as indicated by the reference numeral 570 in order to produce a merged version of the intent save information. Effectively, at this point the two atomic write sequences have been combined into a single merged atomic write sequence.

The write data for the transactions of the second atomic write sequence is then provided to the cache, as indicated by the signal line 575, and then subsequently the write data for those transactions is written to the flash disk, as indicated by the reference numeral 585. Again, the device controller can send an acknowledgement to the host 580 in respect of the second atomic write sequence once it has cached the write data for subsequent storage within the flash. However, there is no need to wait for any of the transactions to have actually been written to the flash before sending the acknowledgement, since the device controller is able to ensure that the transactions occur atomically, or that the state of the flash device can be rolled back to a stable state that existed prior to the write transactions taking place. In the example of FIG. 7B, if the atomicity of the resultant merged atomic write sequence was interrupted, for example by a power failure, then the reboot process described earlier with reference to FIG. 6 would cause a failure of the atomic write sequence to be detected, and for the state of the flash disk to be rolled back by two states instead of one, i.e. back to the state that existed before either the first atomic write sequence or the second atomic write sequence was performed.

As shown in FIG. 7B, once all of the data has been written to the flash, a store finished command 590 can be returned to the device controller 500, in this instance identifying that the merged write sequence has finished.

The store finished command received by the device controller 500, whether it be the individual store finished commands 530, 555 of FIG. 7A, or the merged store finished command 590 of FIG. 7B, is then used by the device controller to identify that the write has taken place, and accordingly the address translation table can be updated within the flash, using the process discussed earlier with reference to FIG. 3. Accordingly, it will be appreciated that the translation table stored within the flash storage device is only updated once the atomic write sequence (whether the original atomic write sequence or a merged atomic write sequence) has completed.

When the disk is heavily used, it will be appreciated that the process of FIG. 7B used to create merged atomic write sequences can cause a translation table update to be postponed potentially almost indefinitely (by each new write sequence addressing pages in the previous write sequence.) This may be undesirable, and accordingly in one embodiment a hard bound policy can be applied. In particular, the device controller may place an upper limit on the number of times atomic write sequences can be merged. Once that upper limit has been reached, then even if a new bundle of transactions is received that addresses pages that are the subject of a preceding merged atomic write sequence, the states will not be merged, and instead the current merged atomic write sequence will complete, and the translation table will be updated, before the next bundle of transactions is allowed to proceed.

Such a policy can be implemented as simply as by stating that after X transaction bundles, there is a hard bound. Alternatively, it may be arranged such that when a page has been updated as part of a first atomic write sequence (which may itself be a merged atomic write sequence), but all of the transactions identified by the intent save information have not yet completed, and that page is to be updated again as part of a new bundle of transactions (a further atomic write sequence), a hard bound is placed before the new bundle of transactions. For example, consider a situation where a first bundle of transactions A (writing pages 1, 2, 3, 4, 5) and a second bundle of transactions B (writing pages 2, 6, 7) are merged, and then a third bundle of transactions C (writing pages 2, 8, 9) arrives. Assuming the page 2 update required by the merged bundles A and B has taken place by the time bundle C arrives, a hard bound will be placed before bundle C, because it is seeking to write to page 2 again.

Additionally, or alternatively, a special command (such as a cache flush command in SCSI) can be used to ensure inter-device state synchronization in certain instances where it is desired to prevent write sequences continuing to be merged using the approach of FIG. 7B. The command will be arranged so that it can only be acknowledged once all of the transactions of a previous bundle have been written to the flash device. This can be used to avoid problems that might otherwise arise where other entities in the system make state transitions based on the new state of the flash disk. For example, if a document were to be cut and pasted from a USB drive and stored on a PC, then if the transaction is successful the PC will erase the document from the flash drive. However, if this erasure is completed before the cache on the SSD in the PC has been evicted, then a system failure may cause the file to disappear. This can be prevented by using the above mentioned special command to ensure inter-device state synchronization takes place, and hence ensuring that the cache on the SSD is evicted before the erasure takes place.

Figure 8A:
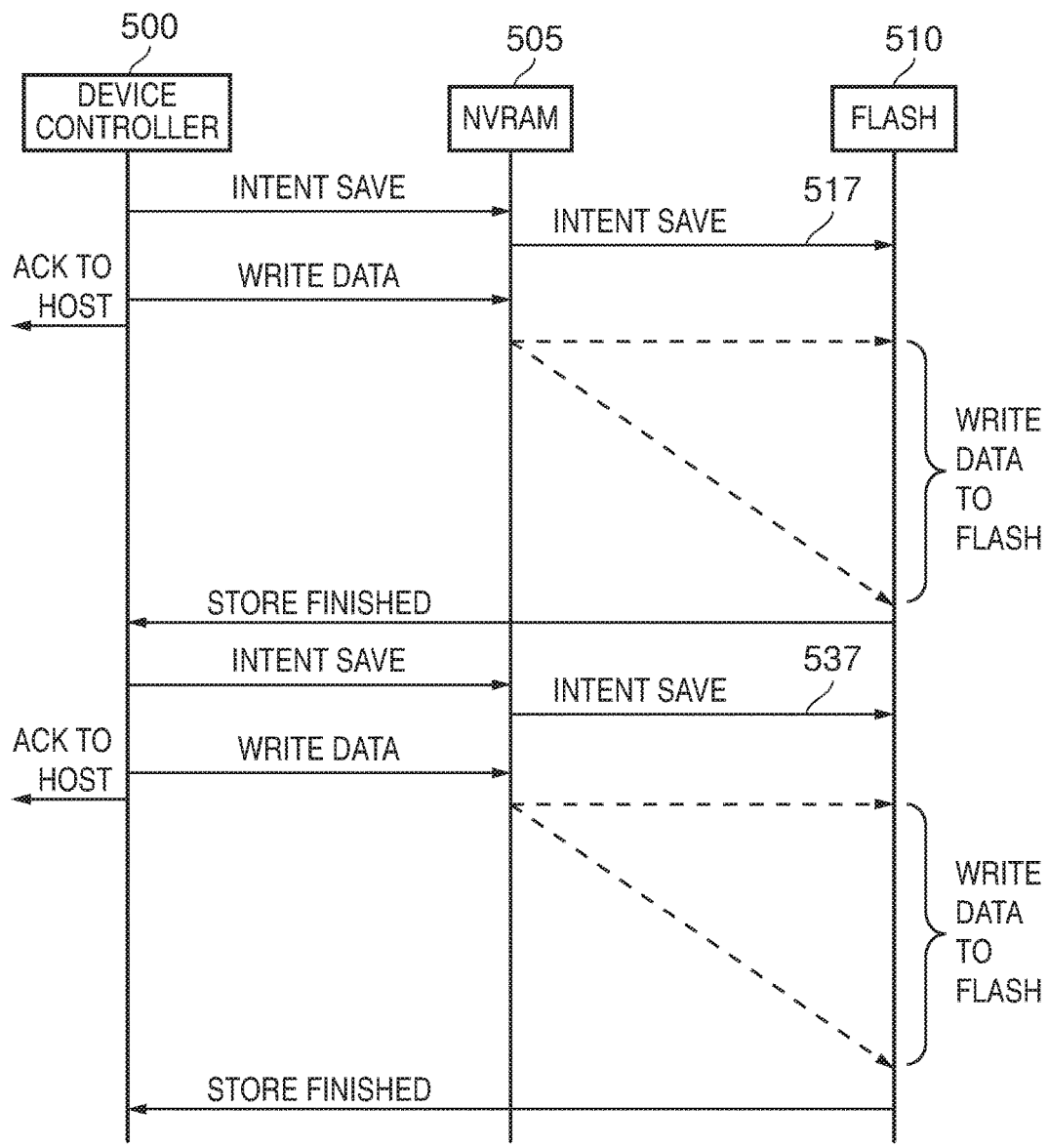
FIGS. 8A and 8B are versions of FIGS. 7A and 7B where the intent save information is also committed to the flash storage, in accordance with one embodiment.
Figure 8B:
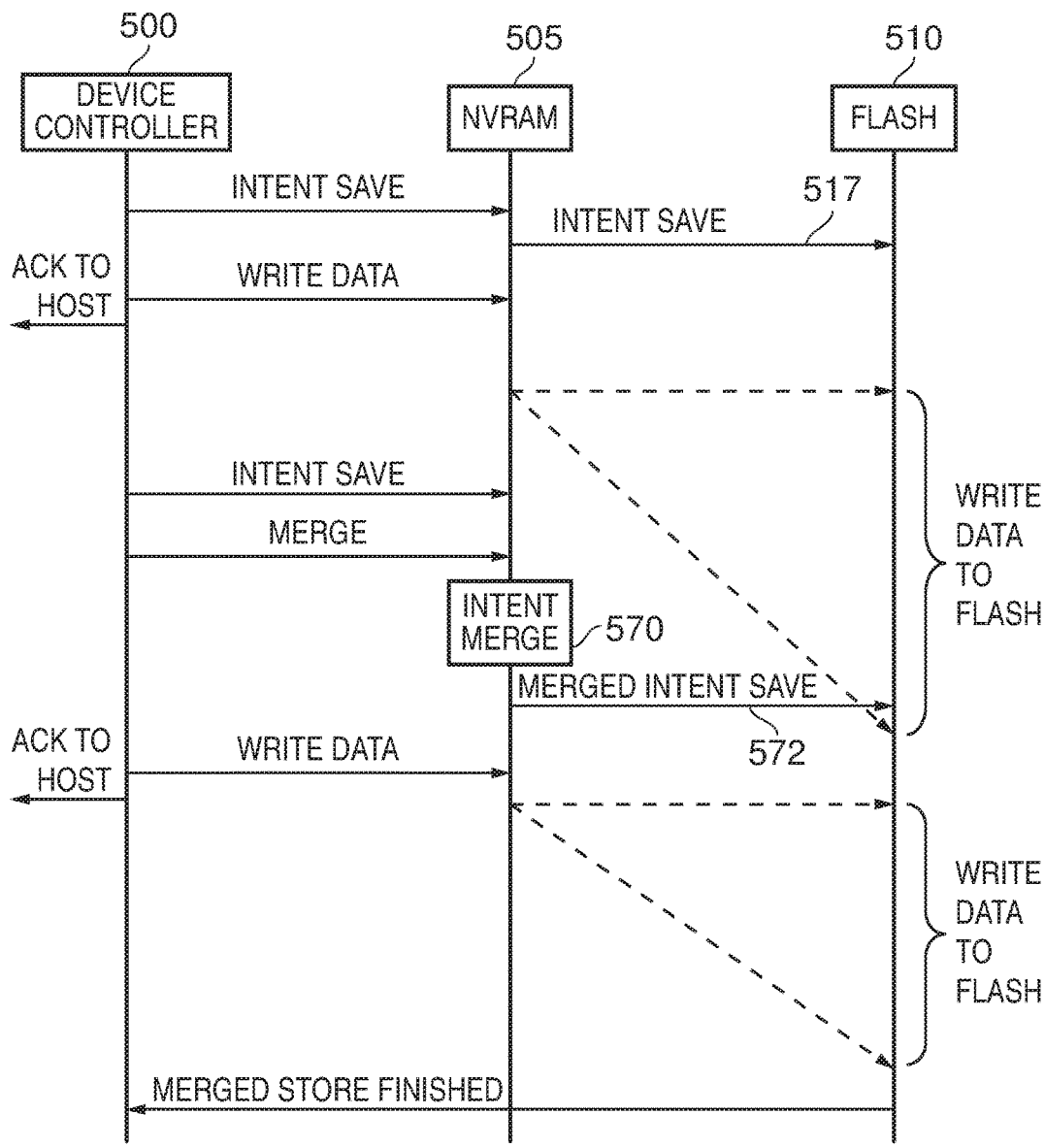

FIGS. 8A and 8B are essentially the same as FIGS. 7A and 7B but illustrate an alternative embodiment where the intent save information is propagated on to the flash device 510, as indicated by the lines 517, 537 in FIG. 8A, and the lines 517, 572 in FIG. 8B. Such an additional step can be taken if the cache is not guaranteed to remain non-volatile in all situations, for example because the quality of the backup battery has decreased.

From the above described embodiments, it will be appreciated that these techniques introduce a mechanism for ensuring atomic and reliable transactions to a state preserving device, without the use of host side implemented safety mechanisms. The mechanism removes the need to confirm the state of the disk before continuing the process. As long as a storage device complies with this mechanism (either through hardware or software running on a device controller), the write transactions can be processed at the storage device's own pace within the storage device, without any concern about a reliable state being recoverable after a power failure. This mechanism will have applicability in respect of a wide range of non-volatile data storage devices, including in association with devices that are not traditionally seen as storing data, for example a sensor node that receives a request from a central point to update a service.

Since the management of the performance of the write transactions atomically is undertaken by the device controller associated with the non-volatile data storage device, it removes the need for the host device to monitor and manage the performance of the write transactions, whilst still enabling the transactions to be processed in an atomic fashion, and whilst providing a reliable mechanism for detecting and recovering from an event that prevents the transactions being performed atomically.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. A method of operating a device controller to perform a plurality of write transactions atomically within a non-volatile data storage device, each transaction specifying a logical address, the method comprising:
    creating an address translation map for the logical addresses specified by said plurality of write transactions, by referencing an address translation record in the non-volatile data storage device to determine for each logical address a corresponding physical address within the data storage device, and if the corresponding physical address indicated in the address translation record already contains valid data, remapping the logical address to a new physical address in said address translation map;
    performing said plurality of write transactions using the logical address to physical address mapping in said address translation map; and
    updating the address translation record in the non-volatile data storage device to identify the logical address to physical address mapping in said address translation map only once said plurality of write transactions have been performed in said non-volatile storage device.

2. A method as claimed in claim 1, further comprising:
    prior to performing the plurality of write transactions, performing an intent save operation to store within an area of the non-volatile data storage device intent information identifying the plurality of write transactions to be performed atomically and the logical address to physical address mapping in said address translation map.

3. A method as claimed in claim 2, wherein the intent save operation is performed as a write transaction having a higher priority than the plurality of write transactions to be performed atomically.

4. A method as claimed in claim 2, wherein said non-volatile data storage device comprises a main non-volatile storage unit and a non-volatile cache configured to buffer data prior to writing of that data into the main non-volatile storage unit, and said area of the non-volatile data storage device where the intent information is stored is within said non-volatile cache.

5. A method as claimed in claim 1, further comprising storing the address translation map in volatile storage associated with the device controller for reference by the device controller when performing said plurality of write transactions.

6. A method as claimed in claim 1, further comprising:
activating a garbage collection process following the step of updating the address translation record in the non-volatile storage device, in order to invalidate any physical addresses no longer mapped to logical addresses by the updated translation record.

7. A method as claimed in claim 1, wherein the device controller receives the plurality of write transactions from a host entity, the host entity identifying to the device controller that the plurality of write transactions are to be handled atomically.

8. A method as claimed in claim 2, wherein in response to a trigger condition, performing the following steps:
obtaining the address translation table and the intent information from the non-volatile storage device; and
determining, for each write transaction identified in the intent information, whether the logical address to physical address mapping indicated by the intent information matches the logical address to physical address mapping in the address translation table.

9. A method as claimed in claim 8, wherein if, for any write transaction identified in the intent information, the logical address to physical address mapping indicated by the intent information does not match the logical address to physical address mapping in the address translation table, the method further comprises the step of invalidating the data at the physical address identified for every write transaction in the intent information.

10. A method as claimed in claim 9, further comprising issuing a notification to a host entity providing an indication that the plurality of write transactions have not been performed.

11. A method as claimed in claim 1, wherein
said non-volatile data storage device comprises a main non-volatile storage unit and a non-volatile cache configured to buffer data prior to writing of that data into the main non-volatile storage unit;
the step of performing said plurality of write transactions comprises initially writing the data of each write transaction to the non-volatile cache and then subsequently storing the data of each write transaction from the non-volatile cache into the main non-volatile storage unit at the physical address specified by the address translation map.

12. A method as claimed in claim 11, wherein said plurality of write transactions form a first atomic write sequence;
following writing of the first atomic write sequence to the non-volatile cache, the device controller is requested to perform a second atomic write sequence comprising a second plurality of write transactions; and
if at least one of said second plurality of write transactions specifies a logical address associated with a write transaction of the first atomic write sequence whose data has not yet been stored within the main non-volatile storage unit, merging the first and second atomic write sequences into a single atomic write sequence such that the data written to the non-volatile cache represents the single atomic write sequence.

13. A method as claimed in claim 12, further comprising:
prior to performing the plurality of write transactions, performing an intent save operation to store within an area of the non-volatile data storage device intent information identifying the plurality of write transactions to be performed atomically and the logical address to physical address mapping in said address translation map; and
updating within the area of the non-volatile data storage device the intent information identifying the plurality of write transactions to be performed atomically and the logical address to physical address mapping in said address translation map, so that the intent information reflects the single atomic write sequence.

14. A method as claimed in claim 12, wherein the step of updating the address translation record in the non-volatile data storage device is performed only after the write transactions of the merged single atomic write sequence have been performed.

15. A method as claimed in claim 12, wherein an upper bound is placed on the number of atomic write sequences that can be merged, and on reaching the upper bound the device controller causes the current merged atomic write sequence to complete, and the update to the address translation record in the non-volatile data storage device to be performed, before allowing a further atomic write sequence to be performed.

16. A method as claimed in claim 12, wherein in response to a predetermined command, the device controller causes a current merged atomic write sequence to complete, and the update to the address translation record in the non-volatile data storage device to be performed, before allowing a further atomic write sequence to be performed.

17. A method as claimed in claim 1, wherein the non-volatile data storage device is a flash storage device comprising a number of storage blocks, each storage block comprising one or more storage pages.

18. A device controller for performing a plurality of write transactions atomically within a non-volatile data storage device, each transaction specifying a logical address, the device controller comprising:
address translation map generation circuitry configured to create an address translation map for the logical addresses specified by said plurality of write transactions, by referencing an address translation record in the non-volatile data storage device to determine for each logical address a corresponding physical address within the data storage device, if the corresponding physical address indicated in the address translation record already contains valid data, the address translation map generation circuitry being further configured to remap the logical address to a new physical address in said address translation map;
transaction control circuitry configured to perform said plurality of write transactions using the logical address to physical address mapping in said address translation map; and
address translation record update circuitry configured to update the address translation record in the non-volatile data storage device to identify the logical address to physical address mapping in said address translation map only once said plurality of write transactions have been performed in said non-volatile data storage device.

19. A computer program product comprising a computer program embodied on a non-transitory computer readable storage medium which when executed on a computer causes the computer to perform the method of claim 1.

20. A device controller for performing a plurality of write transactions atomically within a non-volatile data storage device, each transaction specifying a logical address, the device controller comprising:

address translation map generation means for creating an address translation map for the logical addresses specified by said plurality of write transactions, by referencing an address translation record in the non-volatile data storage device to determine for each logical address a corresponding physical address within the data storage device, if the corresponding physical address indicated in the address translation record already contains valid data, the address translation map generation means further for remapping the logical address to a new physical address in said address translation map;

transaction control means for performing said plurality of write transactions using the logical address to physical address mapping in said address translation map; and address translation record update means for updating the address translation record in the non-volatile data storage device to identify the logical address to physical address mapping in said address translation map only once said plurality of write transactions have been performed in said non-volatile data storage device.

* * * * *